United States Patent
Thornton

(12) 
(10) Patent No.: US 6,916,179 B2
(45) Date of Patent: Jul. 12, 2005

(54) KIT FOR MAKING RUBBINGS

(76) Inventor: Brenda Thornton, P.O. Box 242689, Little Rock, AR (US) 72223

( * ) Notice: Subject to any disclaimer, the term of this patent is extended or adjusted under 35 U.S.C. 154(b) by 0 days.

(21) Appl. No.: 10/652,802

(22) Filed: Aug. 28, 2003

(65) Prior Publication Data

US 2005/0058966 A1 Mar. 17, 2005

(51) Int. Cl.[7] .............................................. G09B 11/00
(52) U.S. Cl. .......................................... 434/85; 434/81
(58) Field of Search ............................. 434/81, 84, 85, 434/87, 88, 89; 427/282, 288

(56) References Cited

U.S. PATENT DOCUMENTS

| | | | |
|---|---|---|---|
| 1,602,356 A | | 10/1926 | Franz |
| 2,427,612 A | | 9/1947 | Lobb |
| 2,941,314 A | | 6/1960 | Schwieger |
| 3,506,324 A | * | 4/1970 | Fristedt ..................... 312/231 |
| 3,510,949 A | | 5/1970 | Christy |
| 3,608,206 A | * | 9/1971 | Knott ........................... 434/81 |
| 4,445,868 A | * | 5/1984 | Nuttal et al. .................. 434/88 |
| 4,468,146 A | | 8/1984 | Tabachnik |
| 4,508,509 A | * | 4/1985 | Cummings .................... 434/88 |
| 4,584,042 A | * | 4/1986 | Wandroik .................... 156/280 |
| 4,604,062 A | * | 8/1986 | Woods .......................... 434/88 |
| 4,863,783 A | * | 9/1989 | Milton ......................... 428/207 |
| 5,100,324 A | * | 3/1992 | Slayton ........................ 434/87 |
| 5,284,445 A | * | 2/1994 | Dietterich et al. .......... 434/419 |
| 5,409,383 A | * | 4/1995 | Mannino .................... 434/414 |
| 5,477,983 A | | 12/1995 | Davis |
| 5,666,712 A | | 9/1997 | Cvetkov |

OTHER PUBLICATIONS

Shuker–Haines, Franny, "Crayon Rubbings", Dec. 1, 2001, Internet Article.
Annie, "Alphabet Rubbings", Jul. 20, 1998, Internet Article.
"Stormie's Stuff for Teachers", Dec. 3, 2001, Internet Article.

* cited by examiner

Primary Examiner—Kurt Fenstrom
(74) Attorney, Agent, or Firm—Boyd D. Cox

(57) ABSTRACT

The present invention is a kit for creating printed images by transferring the bas relief pattern of a rubbing object onto a sheet of paper by a rubbing process. The kit is an educational tool that enhances creativity and develops motor skills. It includes markers, rubbing objects and a rubbing board having a work surface and having storage areas for the markers and rubbing objects.

28 Claims, 10 Drawing Sheets

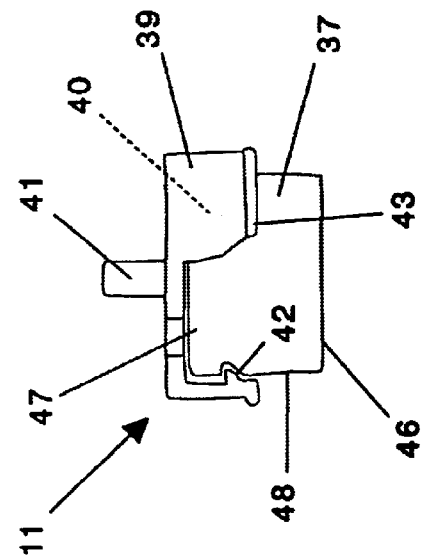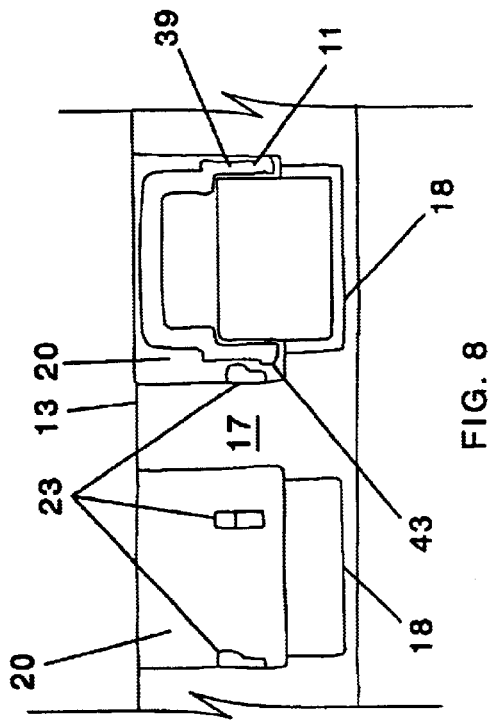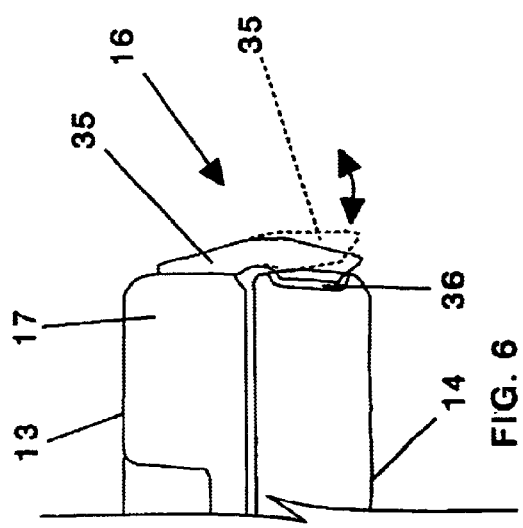

KIT FOR MAKING RUBBINGS

BACKGROUND

The present invention is directed to an educational tool for creating printed images on paper or another similar medium by transferring the image of a pre-selected object or objects onto the paper using a rubbing process. The educational tool is a kit for making prints of selected images and includes a rubbing board, markers and rubbing objects. To transfer an image using the kit of the present invention, a selected rubbing object is arranged on the rubbing board and a sheet of paper is positioned over the rubbing object. A marker, pressed onto the paper, is moved back and forth across the rubbing object and the image is rubbed onto the paper.

As children grow up, it is desirable to engage them in activities which develop their basic motor skills. When such development can be done as a game for fun, teaching and learning becomes an easier task for both teacher and student. Adults with handicaps or limited physical abilities can also benefit from activities or exercises which can develop their motor skills. While such exercises exist, they may not be engaging or entertaining enough to assure that the activity is enthusiastically received and performed.

In addition to developing motor skills, it is essential to encourage and nurture creativity in both children and adults. Creative activities can enhance self esteem and foster cognitive abilities in individuals.

Another aspect of childhood education includes teaching form recognition. Generally, teaching form recognition is dull and repetitive, thereby creating an uninspired learning environment for a child. Such educational techniques can discourage the student who might otherwise be eager to participate in the learning process. Conversely, the student who is inspired to learn can be highly motivated to seek educational opportunities on their own.

The kit of the present invention provides means for developing motor skills which is entertaining and engaging for the user. Through repeated use of selectively shaped objects when making rubbings, the student's form recognition abilities can be improved. By allowing the user to create different rubbed images using different objects, arrangements and colors, his or her creativity can be greatly enhanced.

All of the elements necessary to do a rubbing are contained within the kit and can be readily accessed during use. The kit is portable and can be easily transported, set up and used almost anywhere.

SUMMARY

The present invention is directed to a kit for producing images on paper by a rubbing technique. The kit includes a plurality of markers, a rubbing board and rubbing objects. The markers and rubbing objects can be stored within the rubbing board along with paper onto which the rubbing images are transferred. The rubbing board includes a work surface for supporting the rubbing objects and paper when making the rubbings. To make a rubbing using the kit, one or more rubbing object is arranged on the rubbing surface as desired, a sheet of paper is placed over the rubbing object, and one or more marker is placed on the paper and drawn over the rubbing object(s). The image of a bas relief pattern on the rubbing object(s) is transferred to the paper by the marker(s).

It is an object of the present invention to provide an educational tool to enhance creativity skills of the user.

It is a further object of the present invention to provide an educational tool that develops motor skills of the user.

It is a further object of the present invention to provide a device that presents an activity or entertainment for children and others.

It is a further objective of the present invention to provide an appliance for making colored rubbings.

It is a further object of the present invention to provide a device to facilitate the manufacture of selectively interchangeable designs on paper.

It is a further object of the present invention to provide a device for making rubbings that can be used with a standard sized sheet of paper.

It is a further object of the present invention to provide an apparatus for producing selected designs on a sheet of paper.

It is a further object of the present invention to provide an amusement device that enhances motor skills.

It is a further object of the present invention to provide a marking device that is easy to manipulate by one having limited motor skills.

BRIEF DESCRIPTION OF THE DRAWINGS

Reference is made to the accompanying drawings in which are shown illustrative embodiments of the invention and from which novel features and advantages will be apparent.

FIG. 6 is partial side view of the top and bottom portions of the kit taken along line A—A in FIG. 1 showing the first and second latching parts of the closure fastener.

FIG. 7 is a side view of one of the markers of the preferred embodiment of FIG. 1 with a portion of the element holder removed.

FIG. 8 is a partial side view of first recesses in the top portion of the rubbing board taken along line B—B in FIG. 5.

DETAILED DESCRIPTION

Figure 1:
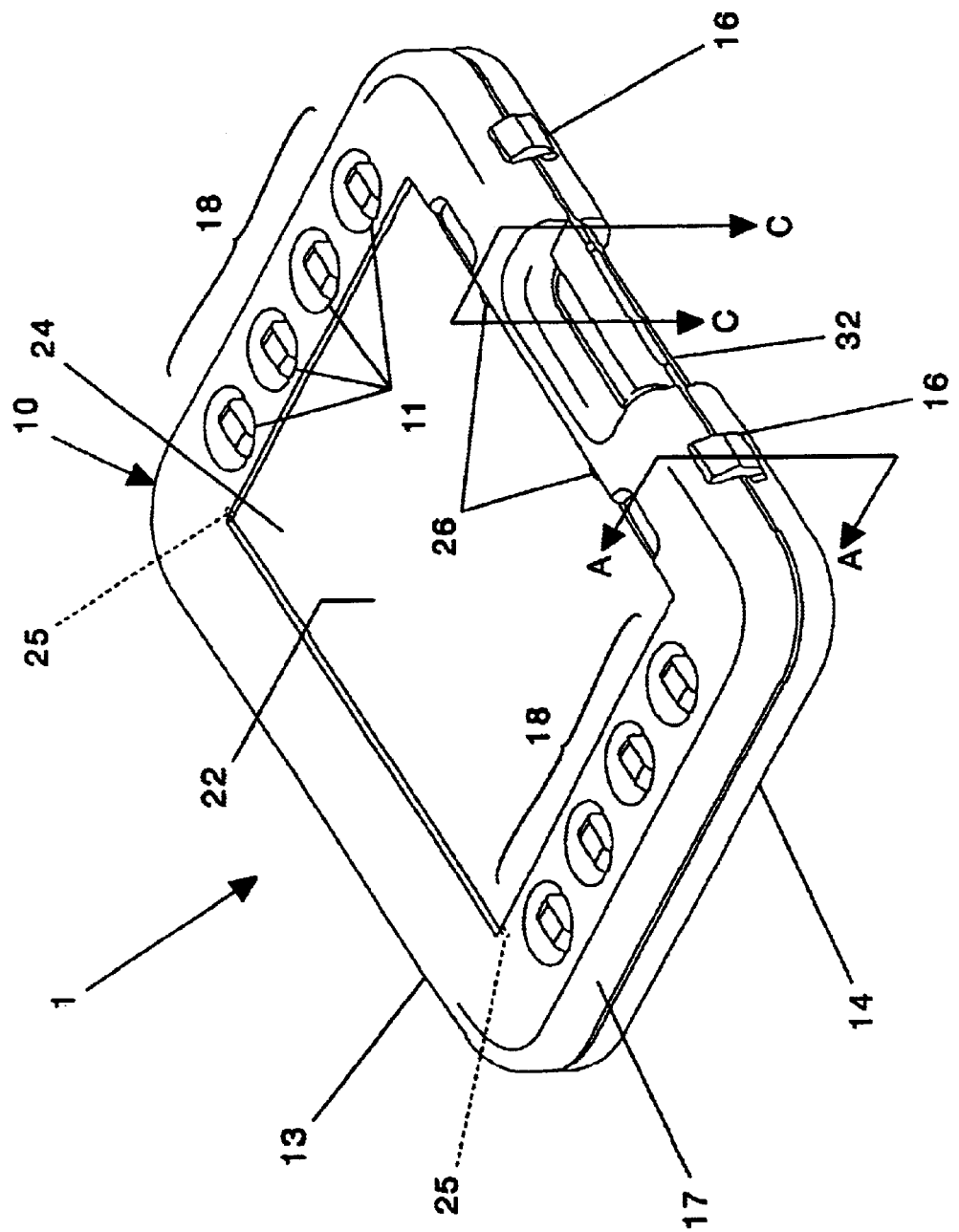
FIG. 1 is a top perspective view of a preferred embodiment of the kit for making rubbings of the present invention.
Figure 2:
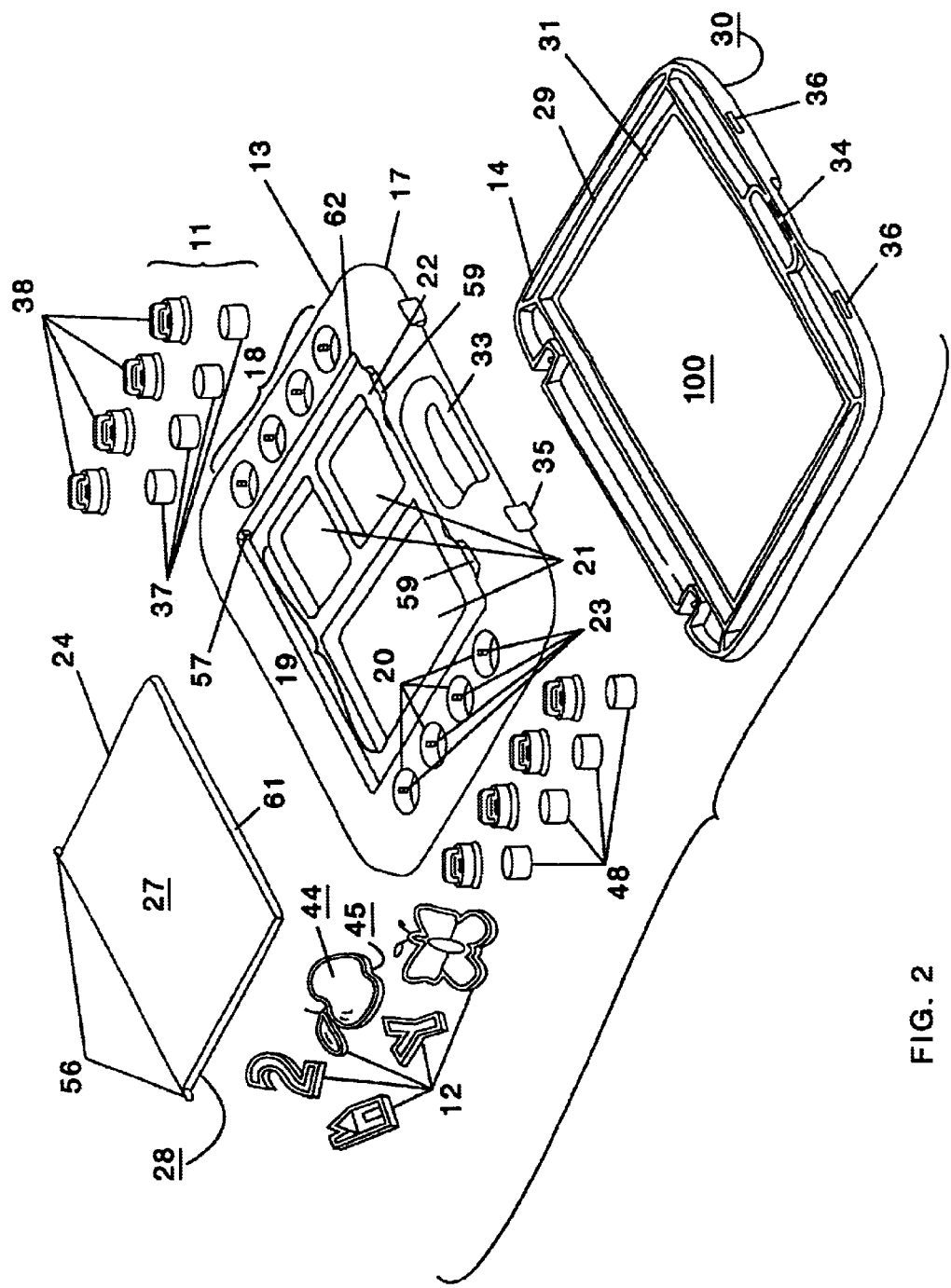
FIG. 2 is an exploded view of the kit of FIG. 1.

Referring to the drawings, there is shown in FIGS. 1 and 2 a preferred embodiment of the present invention comprising a kit 1 for making rubbings. The kit 1 includes a rubbing board 10, a plurality of markers 11 and a plurality rubbing objects 12.

The rubbing board 10 comprises top 13 and bottom 14 portions pivotally attached to each other by a first hinge 15.

Figure 11:
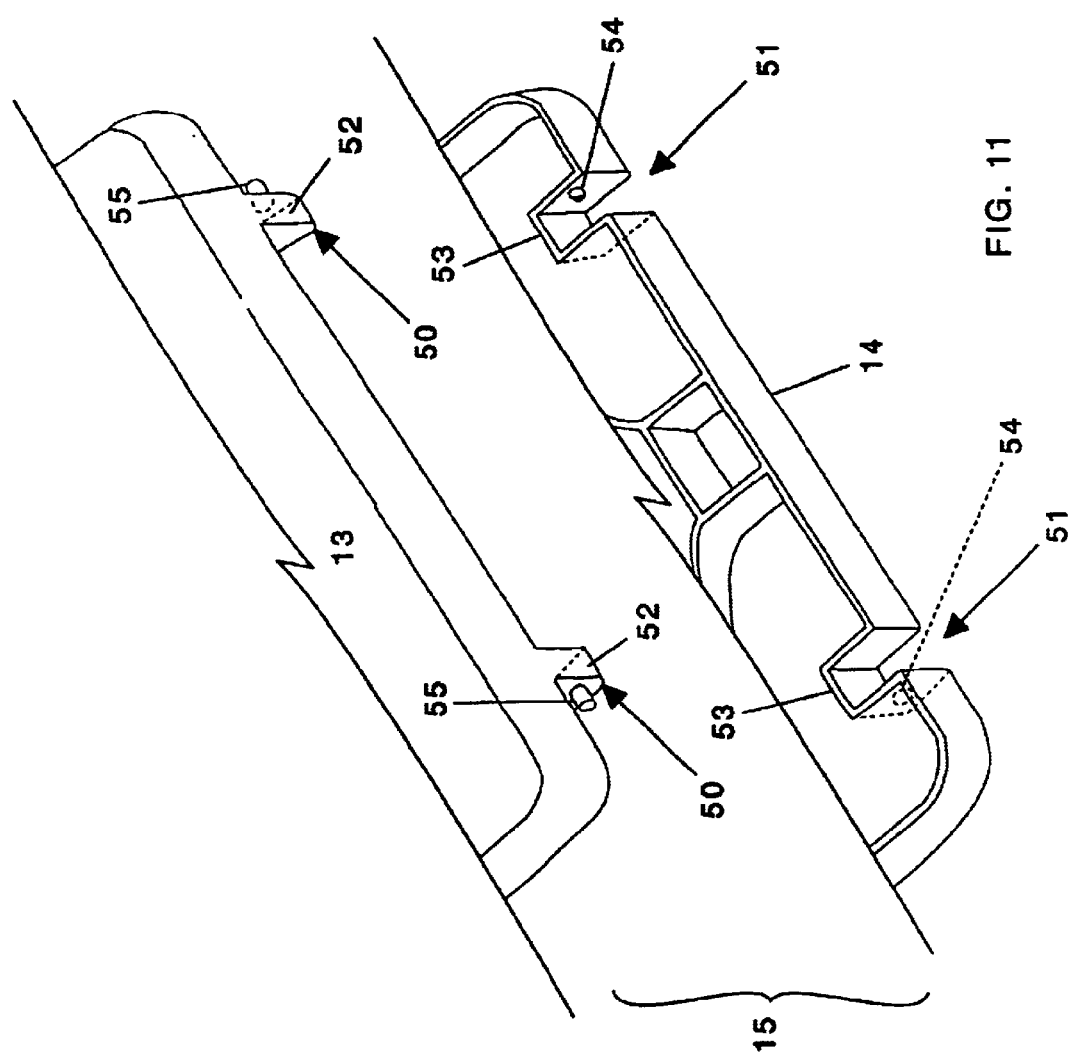
FIG. 11 is a partial exploded view of the rubbing board in FIG. 1 showing the first hinge.

The first hinge 15 as shown in FIG. 11 includes first 50 and second 51 interengaging pieces disposed respectively on the top 13 and bottom 14 portions. On the top portion 13, the first interengaging pieces 50 are a pair of ears 52. On the bottom portion 14, the second interengaging pieces 51 include a pair of ports 53 each of which are adapted to receive an ear 52 therein. Each port 53 has a hole 54 therethrough, while each of the ears 52 includes a button 55 that is pivotally held in the hole 54 of the respective port 53.

Referring back to FIGS. 1 and 2, the top portion 13 of the rubbing board 10 comprises a tray 17 having a marker holder 18 and a rubbing object holder 19 formed therein. The marker holder 18 comprises a plurality of first recesses 20, while the object holder 19 comprises a plurality of second recesses 21. Resilient projections 23 are disposed in each of the first recesses 20 of the marker holder 18. A depression 22 having a sidewall 62 is also formed on the top portion 13. The depression 22 contains the second recesses 21.

The top portion 13 further comprises a cover 24 and a cover fastener 26. The cover 24 is a planar member that is pivotally attached to the tray 17 by a second hinge 25. The planar member has first 27 and second 28 surfaces with the first surface 27 being a work surface on which the rubbings are made.

The bottom portion 14 of the rubbing board 10 is characterized by upper 29 and lower 30 surfaces. The upper surface 29 has a storage area which comprises a third recess 31. The lower surface 30 of the rubbing board 10 preferably rests on a supporting surface, such as a table or the user, during use.

A handle 32 is formed in the top 13 and bottom 14 portions of the rubbing board 10. The handle 32 includes a top part 33 disposed on the top portion 13 of the rubbing board 10 and a bottom part 34 disposed on the bottom portion 14 of the rubbing board 10.

The closure fastener 16, as shown in FIG. 6, releasably holds the top 13 and bottom 14 portions together. When the closure fastener 16 is engaged, no substantial pivotal movement occurs between the top 13 and bottom 14 portions. The closure fastener 16 comprises first 35 and second 36 latching parts. The first latching part 35 is a resilient finger on the top portion 13 that extends downwardly from an outer edge of the tray 17. The second latching part 36 is an indentation on an outer edge of the bottom portion 14 of the rubbing board 10. The resilient finger of the first latching part 35 is adapted to overlap the outer edge of the bottom portion 14 and snap fit into the indentation of the second latching part 36 to releasably engage and lock the closure fastener 16. Although the closure fastener 16 of the preferred embodiment comprises a resilient latch, other types of suitable fasteners, including buckles, male/female fasteners and clips could be used instead.

Figure 3:
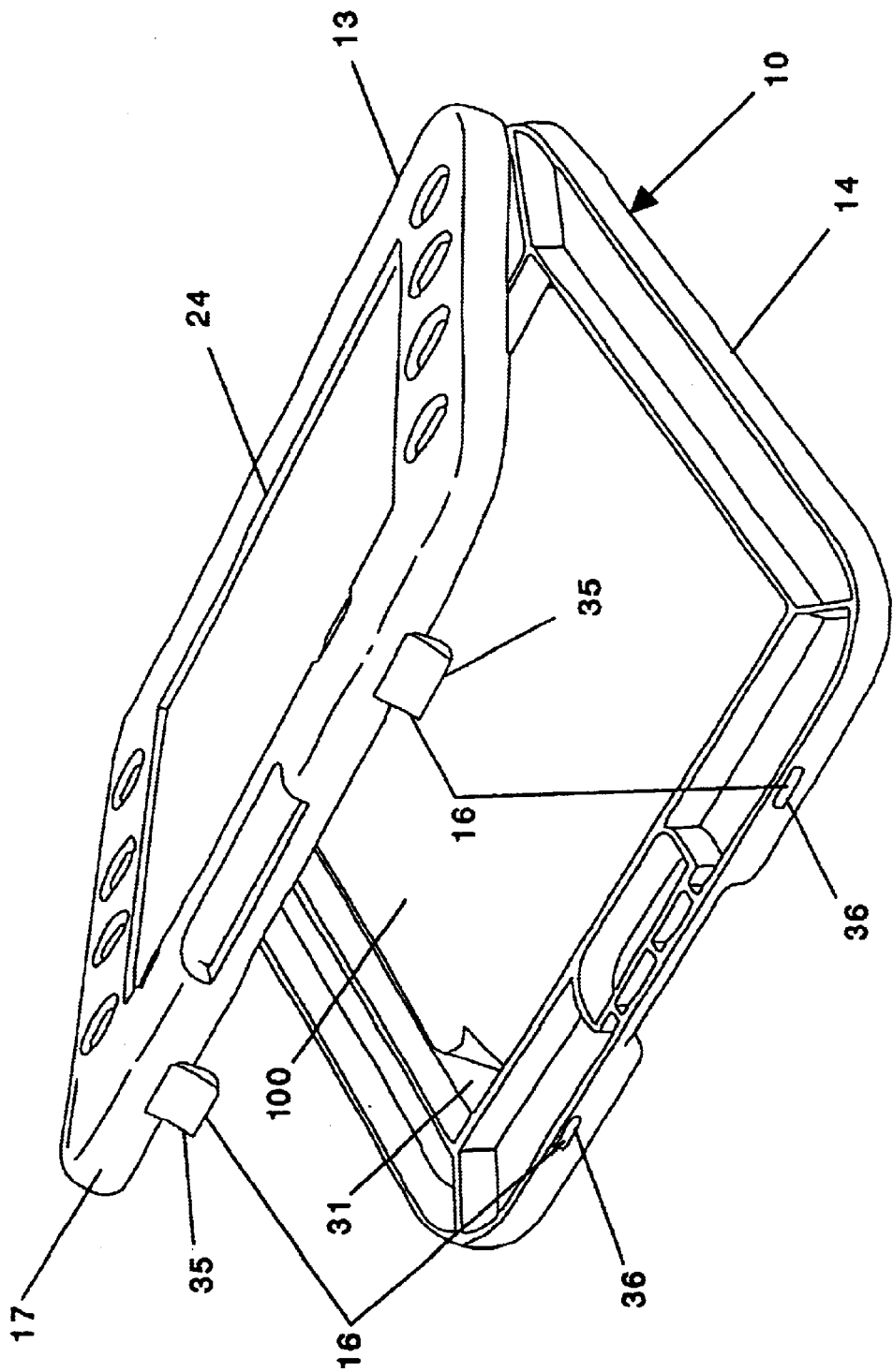
FIG. 3 is a perspective view of the rubbing board of FIG. 1 shown in an open configuration.

The rubbing board 10 comprises closed and opened configurations as shown in FIGS. 1 and 3, respectively. In the closed configuration of FIG. 1, the top 13 and bottom 14 portions extend adjacently to each other such that a lower surface of the tray 17 is next to an upper surface 29 of the bottom portion 14. When the rubbing board 10 is in the closed configuration, the closure fastener 16 is engaged; the third recess 31 on the bottom portion 14 is covered by the top portion 13; and stored items, such as paper, are protected. The closure fastener 16 secures the top 13 and bottom portions 14 against pivotal movement in the closed configuration.

In the opened configuration of FIG. 3, the top 13 and bottom 14 portions extend angularly away from each other, making the third recess 31 readily accessible. In addition, the first 35 and second 36 latching parts of the closure fastener 16 are not engaged.

Figure 9:
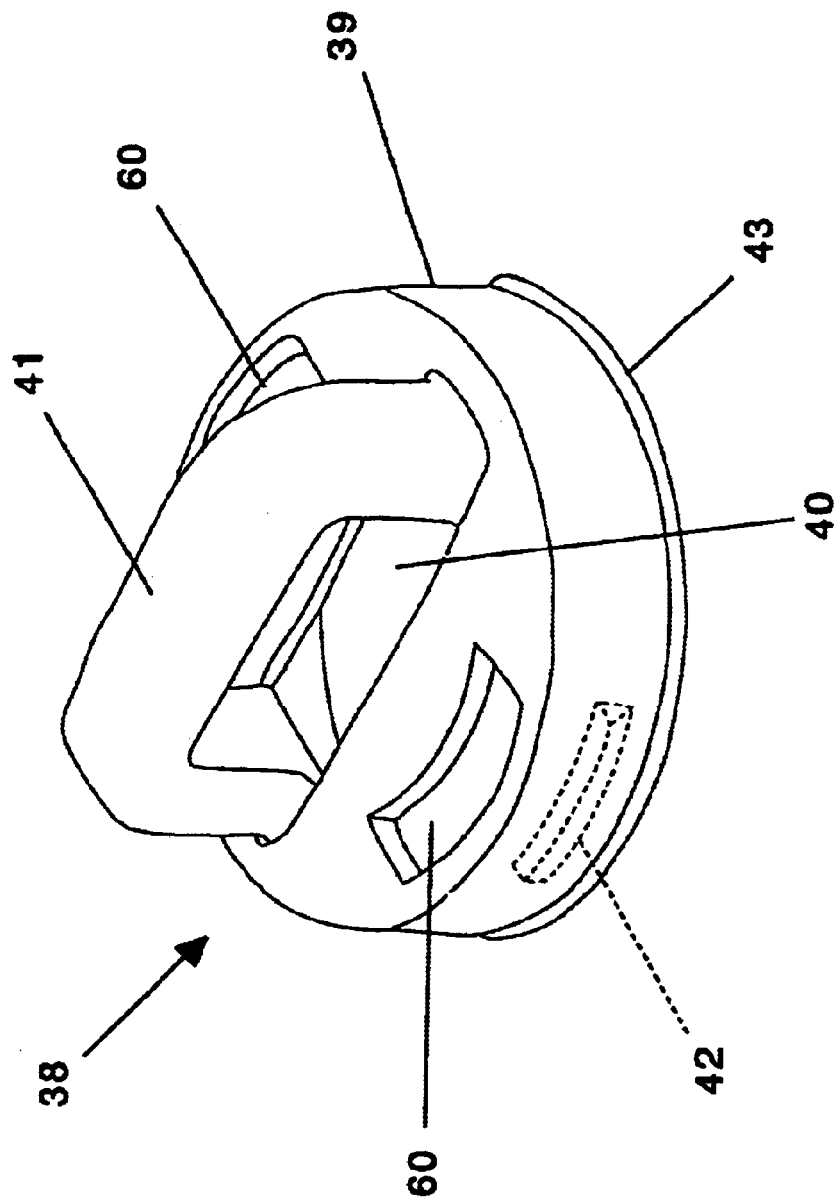
FIG. 9 is a top perspective view of the element holder of FIG. 1.

Referring to FIGS. 7 and 9, the marker 11 includes a writing element 48 and an element holder 38. Preferably, the writing element 48 is a crayon 37, although other types of suitable writing elements could be used instead. The writing element 48 has a free end 46 and an attached end 47. The element holder 38 comprises a body 39 with a receptacle 40 and a marker handle 41. A lip 43 extends around an outer circumference of the body 39. The writing element 48 is held within the receptacle 40 by a gripping means for removably gripping the writing element 48 within the receptacle 40 of the body 39. The gripping means comprises a plurality of teeth 42 disposed inside of the receptacle 40. A pair of slots 60 in the body 39 flank the marker handle 41. The slots 60 facilitate the removal of the element holder 38 from a mold during the manufacturing process.

In FIG. 2, each rubbing object 12 has front 44 and back 45 surfaces. The front surface 44 includes a bas relief pattern such as a raised design for rubbing. A frictional engagement occurs between the back surface 45 of the rubbing object 12 and the first surface 27 of the cover 24. The frictional engagement deters relative movement between the rubbing object 12 and the cover 24 when the rubbing object 12 is positioned on the first surface 27. This holds the rubbing object 12 in place on the first surface 27 of the cover 24 while a rubbing is made.

In a preferred embodiment, the marker 11 is generally cylindrically shaped with a U-shaped marker handle 41 located on one end of the marker 11. The writing element 48 has a circular cross section and the shape of the receptacle 40 coincides with that circular cross section in order that the writing element 48 fit snugly therein. To facilitate receiving and storing the markers 11, the first recesses 20 of the marker holder 18 are also circular in cross section. Other suitable cross sectional shapes for the writing element 48 and receptacle 40 may be used instead. Were the writing element 48 and receptacle 40 to have a cross section other than circular, the first recesses 20 would preferably coincide with that cross sectional shape.

The rubbing board 10 preferably has a rectangular shape with a generally flattened profile to facilitate not only transporting, but also using and storing the kit. The cover 24 on the rubbing board 10 is rectangular and is only slightly larger than the size of a standard sheet of paper 100 (8.5"×11"). Preferably, the depression 22 on the top portion 13 is only slightly larger than the dimensions of the cover 24 so that when using a standard sheet of paper to make a rubbing, the paper will be closely bound by the sidewalls 62 of the depression 22. The dimensions of the cover 24 and depression 22 readily accommodate a standard size sheet of paper, but could be varied in size as desired to fit other sized sheets of paper. Although, any size sheet of paper could be used with the kit 1, it is preferable that the paper be about the same size as the depression 22 in order to deter the paper from sliding when making a rubbing.

Each of the rubbing objects 12 is generally planar with the front surface 44 having the raised design of the bas relief pattern. The shapes and designs of each rubbing object 12 can vary as desired to include letters, numbers, animate and inanimate objects and other concrete or abstract forms.

In a preferred embodiment, the crayon 37 comprising the writing element 48 is made of a wax-based medium with a color pigment additive. The wax-based medium is manufactured by the Dixon Ticonderoga Company located in Heathrow, Fla. Each of the crayons 37 in the kit can be a different color. Although a wax based crayon is preferable, other suitable types of materials, such as lead, chalk or charcoal could be used in lieu of the wax-based medium for the writing element 48.

The element holder 38 and the rubbing board 10 are made of high density plastic, while the rubbing objects 12 are made of soft plastic. The soft plastic of the latter has a durometer of less than that of the element holder 38 and the rubbing board 10. The consistency of the soft plastic creates the frictional engagement between the rubbing objects 12 and the first surface 27 of the cover 24.

Preferably, the element holder 38 and rubbing board 10 are made of Alathon H 5112, a high density polyethylene having a durometer of about 68. It is manufactured by Equistar Chemicals LP located in Houston, Tex. The rubbing objects 12 are preferably made of Ultrathene UE 685-009, an ethylene vinyl acetate which is also manufactured by Equisatar Chemicals LP.

While polyethylene is preferred, other suitable materials could be used instead, such as fiberglass and lightweight composites, to make the rubbing board 10 and element holder 38. In addition to using soft plastics for making the rubbing objects 12, other suitable materials, including rubber, could be used instead.

The rubbing board 10 is a work station and a storage/carrying case. It stores markers 11, rubbing objects 12 and paper 100. Each of the first recesses 20 in the tray 17 can hold a marker 11 as shown in FIG. 8. The lip 43 on the body 39 of the marker 11 and the resilient projections 23 in the first recesses 20 of the marker holder 18 cooperate to form retaining means for releasably retaining the marker 11 in the marker holder 18. The retaining means releasably secures each marker 11 in a respective first recess 20 of the marker holder 18.

In FIG. 3, the third recess 31 which is disposed in the bottom portion 14 is a storage area for holding paper 100. It can also be used to store finished rubbings and/or other accessories. In the closed configuration, the top portion 13 fits over the bottom portion 14 and substantially covers the third recess 31. With the third recess 31 covered by the top portion 13, the paper 100 positioned in the third recess 31 is secured against inadvertent removal.

The cover 24 on the rubbing board 10 limits access to the second recesses 21 on the tray 17 and further comprises lowered and raised positions. Referring to FIG. 1 with the cover 24 in a lowered position, the cover 24 is held within the confines of the depression 22 and the cover fastener 26 is engaged. In this position, the cover 24 extends across an upper surface of the top portion 13 and covers the second recesses 21 of the rubbing object holder 19. With the second recesses 21 closed, the stored rubbing objects 12 are retained within the object holder 19.

Figure 4:
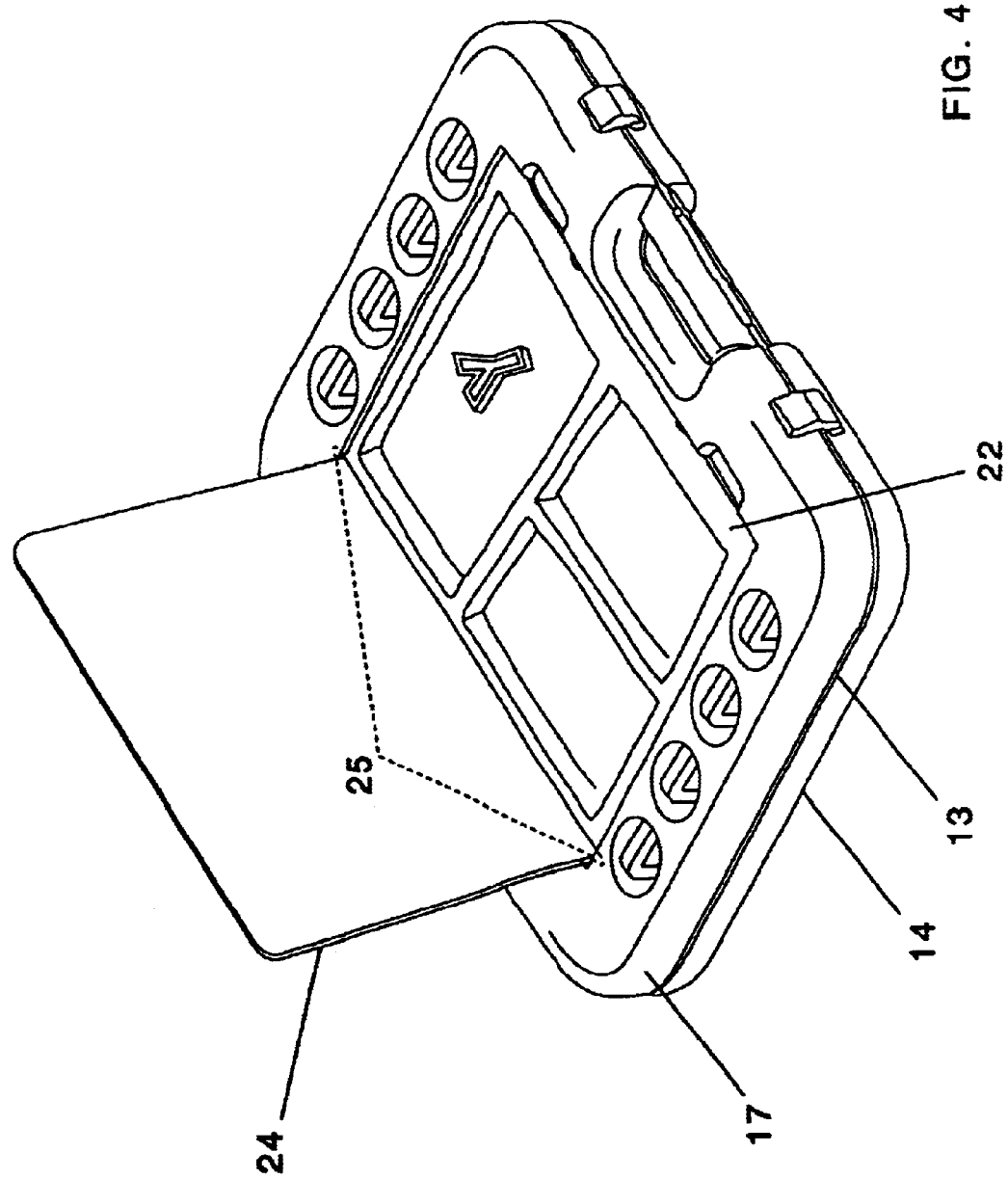
FIG. 4 is a perspective view of the kit of FIG. 1 with the cover shown in a raised position.

To move the cover 24 into the raised position as shown in FIG. 4, the cover fastener 26 is disengaged as the cover 24 is pivoted in a direction that is up and away from the depression 22 and tray 17. With the cover 24 in the raised position, the rubbing objects 12 stored in the second recesses 21 are accessible.

Figure 5:
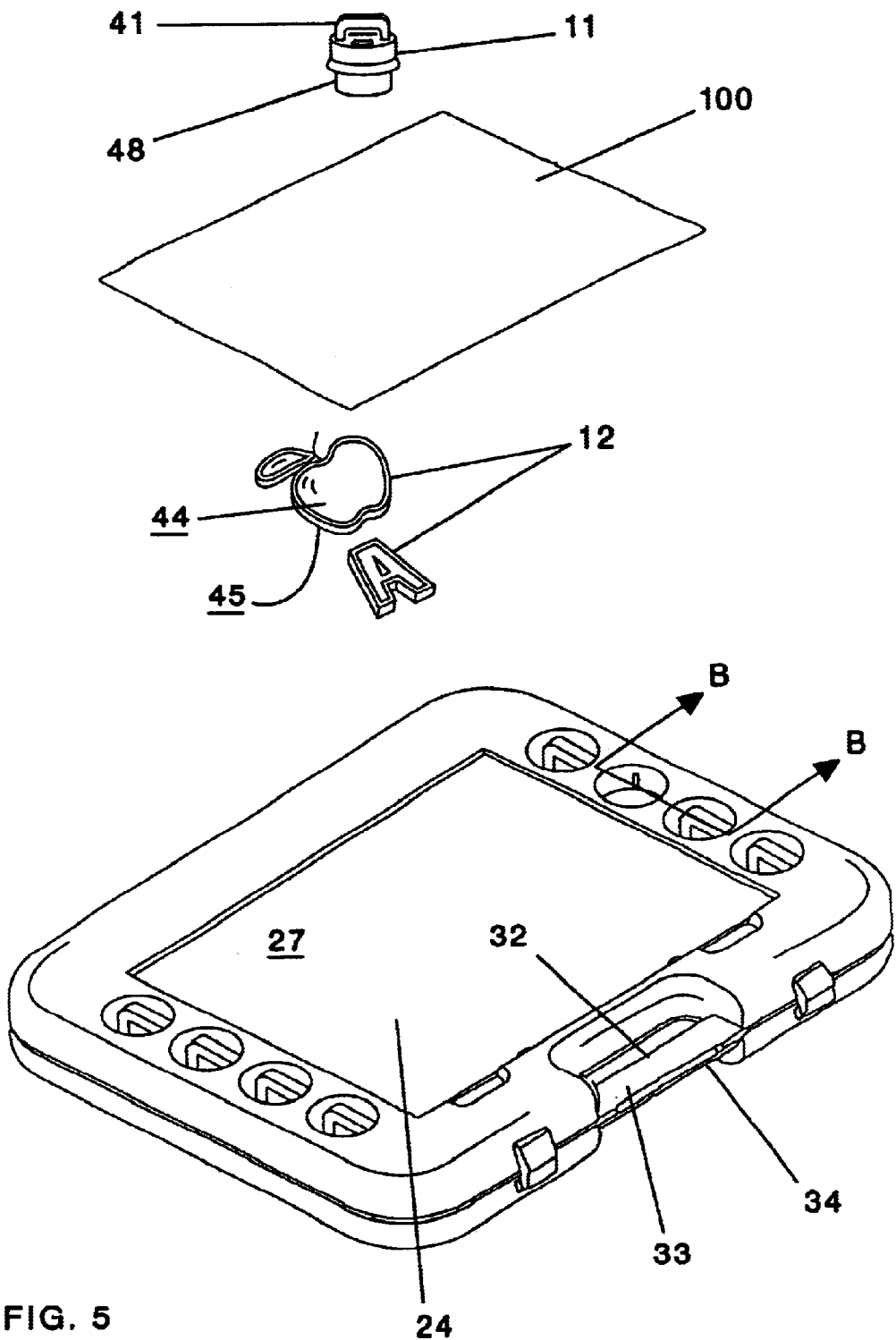
FIG. 5 is an exploded view showing the rubbing board, rubbing objects, sheet of paper and marker of FIG. 1 in position to make a rubbing.
Figure 10:
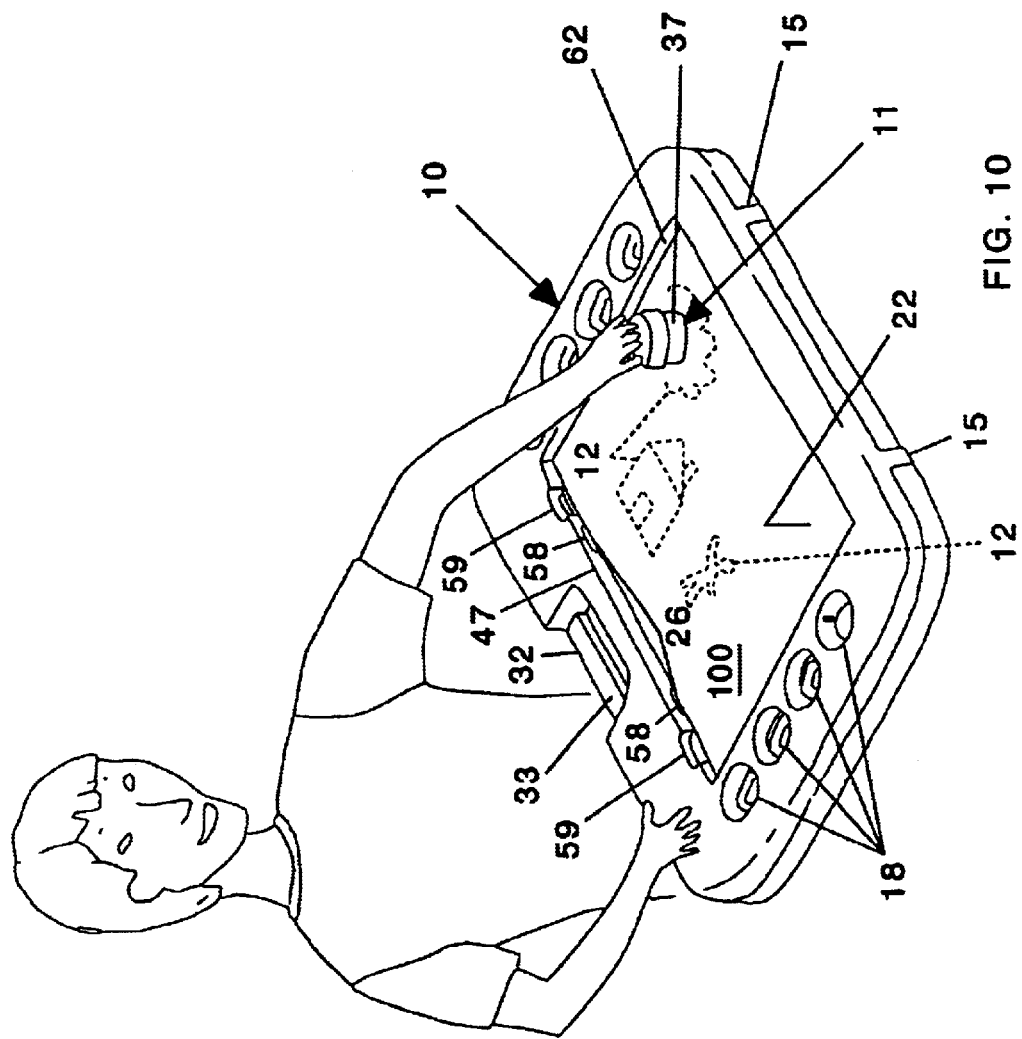
FIG. 10 shows a user making a rubbing with the kit of FIG. 1.

The cover 24 also serves as a work surface for doing rubbings, as shown in FIGS. 5 and 10. As part of the process, selected rubbing objects 12 are arranged on the first surface 27 of the cover 24 and then the paper 100 is placed over the arranged rubbing objects 12 on the cover 24. The back surface 45 of each rubbing object 12 frictionally engages the first surface 27 of the cover 24. This frictional engagement substantially reduces unwanted movement of the rubbing objects 12 on the cover 24 during use. Reducing movement of the rubbing objects 12 during the rubbing process is advantageous for producing a crisp, clear image on the paper 100.

The rubbing board's handle 32 provides means for carrying the kit 1. The top 33 and bottom 34 parts of the handle 32 are disposed adjacently to each other when the rubbing board 10 is in the closed configuration. The top 33 and bottom 34 parts are held adjacent to each other when the kit 1 is carried by its handle 32. This arrangement helps to maintain the top 13 and bottom 14 portions of the rubbing board 10 in the closed configuration during transport. In addition, each of the top 33 and bottom 34 parts of the handle 32 can be grasped individually to manipulate the respective top 13 and bottom 14 portions, especially when moving the rubbing board 10 between open and closed configurations.

The marker 11 transfers the bas relief pattern from the front surface 44 of the rubbing object 12 onto the paper 100. The marker handle 41 provides means for a user to grip the marker 11, especially when removing it from the marker holder 18 and when making a rubbing. By holding and manipulating the marker 11 using the handle 41, the user can avoid getting pigment from the writing element 48 on his or her hands when making a rubbing.

Figure 12:
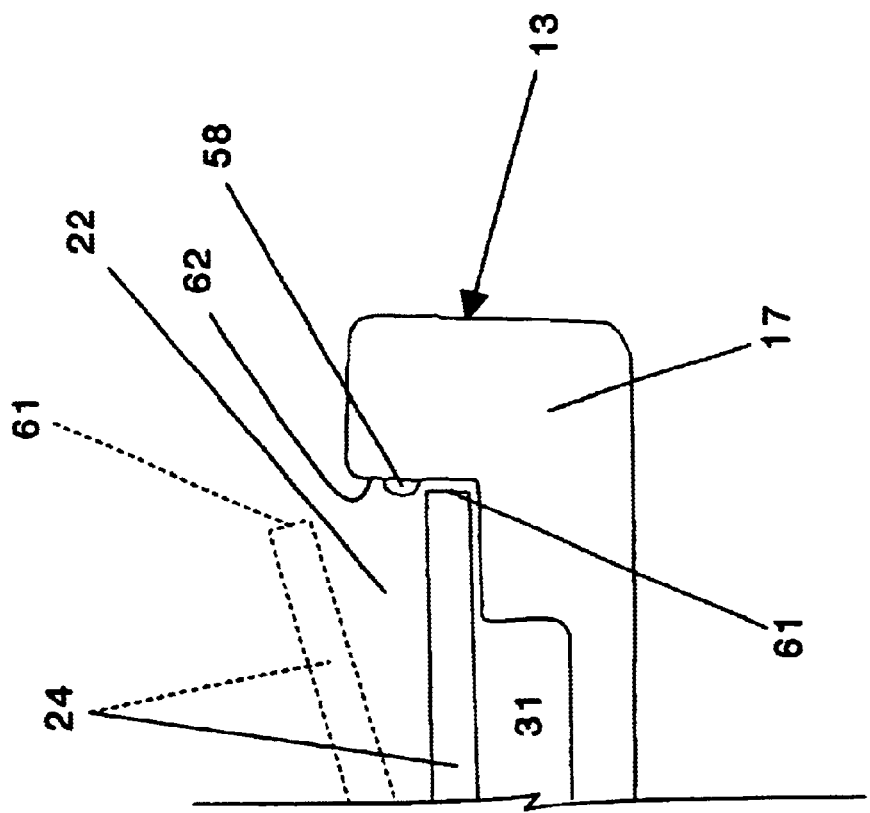
FIG. 12 is a partial side view of the rubbing board taken along line C—C in FIG. 1.

The cover fastener 26 in FIGS. 10 and 12 includes a pair of protrusions 58 on the sidewall 62 of the depression 22 to releasably secure the cover 24 in the lowered position. The protrusions 58 extend into the depression 22 slightly more than the shortest distance between an outer edge 61 of the cover 24 and the sidewall 62. As the cover 24 is moved from the raised position to the lowered position, the outer edge 61 snaps over the protrusions 58 thereby engaging the cover fastener 26 and releasably holding the cover 24 in the lowered position. The resultant engagement retains the cover 24, as shown by the solid lines of FIG. 12, within the depression 22. To move the cover 24 from the lowered position to the raised position, the cover 24 is pivoted away from the tray 17. The outer edge 61 is forced to snap over the protrusions 58, thereby disengaging the cover fastener 26 and moving the cover 24, as shown by the dotted lines in FIG. 12, into the raised position. Although a snap fitting engagement is shown herein, other suitable releasable fasteners could be used in lieu of the protrusions of the present embodiment to secure the cover. Other suitable fasteners could include resilient clips and interengaging fasteners.

A pair of notches 59 in the top of the tray 17 provide access to the edge 61 of the lowered cover 24 to facilitate lifting the cover 24 from the lowered position. Each of the notches 59 are confluent with the sidewall 62 of the depression 22 and are adjacent to the protrusions 58. In addition, the notches 59 extend deeper into the tray than the depression 22.

When not in use, the markers 11 can be stored in the marker holders 18 as shown in FIG. 8. Each one of the markers 11 can be fitted into a respective first recess 20. The lip 43 extending around the body 39 of the marker 11 cooperates with the resilient projections 23 in the first recesses 20 of the marker holder 18. The resilient projections 23 snap fit over the lip 43 when a marker 11 is fully inserted into a first recess 20 to hold the marker 11 therein. When the marker 11 is removed, the resilient projections 23 snap back over the lip 43 thereby releasing the marker 11 from the first recess 20.

Referring to FIG. 7, the gripping means is a plurality of teeth 42 disposed on the interior of each receptacle 40 of a respective marker 11. Each tooth 42 engages an outside surface of the writing element 48 to hold it in the receptacle 40. Preferably, each receptacle 40 has a pair of teeth 42 that are disposed opposite to each other. Each tooth 42 is adapted to dig into the surface of the writing element 48 as it is inserted into the receptacle 40.

In a preferred embodiment, the writing element 48 is sized to fit within the receptacle 40 of the body 39. Similarly, the element holder 38 is sized to receive a marker 11 therein. The rubbing board 10 is of a size for portability and convenience. Preferably, it is about 13"×16"×2". The cover 24 is approximately 8½"×11" and can accommodate a standard sized sheet of paper. Each of the second recesses 21 of the object holders 19 is larger in dimension than the associated rubbing objects 12 in order that the objects 12 fit within the second recesses 21. The depression 22 in the tray 17 is sized so that the cover 24 will fit into the depression 23.

The markers 11 are stored in the marker holder 18 with each marker 11 being held in a respective first recess 20. When a marker 11 is fully inserted into a first recess 20, the resilient projections 23 extend outwardly over the lip 43 on the marker 11. Using a force great enough to overcome the resistance of the resilient projections 23, the marker 11 can be repeatedly removed from and inserted into a first recess 20. As the marker 11 moves into or out of the first recess 20, the lip 43 pushes the resilient projections 23 inwardly as it passes the projections 23. The projections 23 return to a relaxed, outwardly extending position when the lip 43 has passed thereby. Once removed from the first recess 20, the marker 11 is ready for use.

The rubbing objects 12 are stored in the second recesses 21 of the object holder 19. To retrieve rubbing objects 12, the rubbing board 10 is moved to an opened configuration so that the second recesses 21 are accessible and the rubbing objects 12 can be selectively removed therefrom. Once the rubbing objects 12 are removed, the rubbing board 10 is moved to the closed configuration and the selected rubbing objects 12 are arranged on the cover 24 with their back surfaces 45 positioned adjacent to the first surface 27 and the bas relief pattern on the front surface 44 facing away from the cover 24. Positioned, thusly, the rubbing objects 12 are ready for making a rubbing.

The marker handle 41 is attached to one end of the body 39, while the receptacle 40 opens from the opposite end of the body 39. The attached end 47 of the writing element 48 is fitted into the receptacle 40, while the free end 46 extends outwardly from the body 39 opposite the handle 41. When making a rubbing, the free end 46 of the writing element 48 is placed adjacent to the paper 100. Markings from the free end 46 are then rubbed onto the paper 100.

When making a rubbing, the cover 24 of the rubbing board 10 is in the lowered position and the rubbing board 10 is in the closed configuration. Preferably, the rubbing board 10 is positioned in a generally horizontal position with the first surface 27 of the cover 24 being accessible to the user as shown in FIG. 10. The rubbing board 10 can be positioned on various supporting surfaces for use, including desks, tables, countertops, seats and floors. It can also be held by the user. The rubbing objects 12 are placed on the first surface 27 and the paper 100 is positioned over the rubbing objects 12.

To facilitate selection of a desired marker 11, the color of the element holder 38 can coincide with the color of its respective crayon 37. When not in use, the markers 11 are stored in the marker holder 18 with the handles 41 facing outwardly to give a user easy access to the markers 11. The first recesses 20 of the marker holder 18 extend down opposite sides of the tray 17. This location provides a user with high visibility and easy access to the markers 11. If desired, the marker holder 18 could be positioned in other areas on the rubbing board 10 instead.

Referring to FIG. 3, the first hinge 15 on the rubbing board 10 is situated along the adjacent edges of the top 13 and bottom 14 portions. The closure fastener 16 is located along a side of the top 13 and bottom 14 portions that is disposed opposite to the first hinge 15. The handle 32 is located on the same side of the rubbing board 10 as the closure fastener 16 is located.

To make a rubbing using the kit of the present invention, the top 13 and bottom 14 portions are moved from the closed configuration to the open configuration thereby allowing access into the third recess 31. Paper 100 stored in the third recess 31 is removed from the bottom portion 14 and the rubbing board 10 is returned to the closed configuration. With the cover 24 in the raised position to reveal the rubbing objects 12 stored in the second recesses 21, at least one rubbing object 1 is selected and removed from the tray 17. The cover 24 is returned to the lowered position within the depression 22. The rubbing object(s) 12 is positioned in a desired manner on the first surface 27 of the cover 24 with the back surface 45 of the rubbing object 12 adjacent to the first surface 27. Once the object(s) 12 is positioned to the user's preference, a sheet of paper 100 is placed over the cover 24 within the depression 22, to rest directly on the front surface 44 of the selectively positioned rubbing object (s) 12. A marker 11 is selected and removed from the marker holder 18. The marker 11 is placed on top of the paper 100 with its free end 46 touching the paper 100. Maintaining a slight downward pressure, the marker 11 is rubbed over the surface of the paper 100, as well as over the desired rubbing object(s) 12 situated under the paper 100. As the marker 11 is moved across the paper 100, an image of the bas relief pattern on the front surface 44 of the rubbing object 12 is transferred to the paper 100 by the writing element 48. This process may be repeated with different markers and/or rubbing objects, if desired.

Variations and combinations for making the rubbed images are possible. For example, additional images can be made one on top of the other by using a different rubbing object or changing the combination of rubbing objects on the rubbing board to make the rubbing. A single color or different colors can also be used to create a desired image on a sheet of paper. By using more than one marker, the different colors can create multi-colored images on a single sheet of paper.

The kit for making rubbings is an educational tool that enhances creativity by enabling the production of an almost unlimited number of images by using different colors and rubbing objects all of which can be selected by the user. Since a certain degree of coordination and dexterity are required to make rubbings, the present invention can enhance and improve the motor skills of a user. The kit is easy to use and is portable with the supplies needed to make rubbings contained therein.

In an alternate embodiment, the rubbing object is positively held on the cover by a magnetic force. A magnet or magnetized particles are disposed within the rubbing object and the cover on the top portion of the rubbing board is made of a magnetically attractive material. A magnetic attraction between the magnet in the rubbing object and the magnetically attractive material of the cover secures the rubbing object to the work surface.

In another alternate embodiment, the materials comprising the cover and the rubbing objects are such that an electrostatic force is created between the back surface of the rubbing objects and the first surface of the rubbing boards cover. The resulting electrostatic force creates an adhesion that holds the selected rubbing objects in place on the cover.

Although the present invention has been described in considerable detail with reference to certain preferred versions thereof, other versions are possible. Therefore, the spirit and scope of the appended claims should not be limited to the description of the preferred versions contained herein.

What is claimed is:

1. A kit for making rubbings comprises:
   a rubbing board;
   at least one marker; and
   at least one rubbing object;
   said rubbing board includes a top portion comprising a tray and a cover;
   said tray having a rubbing object holder;
   said cover having first and second surfaces, wherein said first surface is a work surface for supporting said at least one rubbing object when making a rubbing; and
   said at least one rubbing object comprises a front surface with a bas relief pattern.

2. The kit of claim 1, wherein said tray comprises a depression having a sidewall extending around a perimeter of the depression, wherein the work surface is positioned within the depression and the sidewall of the depression extends beyond the work surface.

3. The kit of claim 1, wherein said at least one rubbing object further comprises a back surface which forms a frictional engagement with said first surface of the cover.

4. The kit of claim 1, wherein said rubbing board includes a paper storage area.

5. The kit of claim 4, wherein said rubbing board further comprises a bottom portion attached to said top portion; and said paper storage area comprises a recess disposed on the bottom portion.

6. The kit of claim 5, wherein said top portion of the rubbing board is pivotally attached to the bottom portion by a first hinge, and the top and bottom portions rotate between opened and closed configurations; when said rubbing board is in the opened configuration the paper storage area is opened and accessible to a user; and when said rubbing board is in the closed configuration, the paper storage area is covered by the top portion.

7. The kit of claim 6, wherein said rubbing board further comprises a closure fastener for releasably securing the top and bottom portions in the closed configuration.

8. The kit of claim 7, wherein the closure fastener comprises a first latching part disposed on one of the top and bottom portions and a second latching part on the other of said top and bottom portions, said first latching part snap fits into the second latching part when the closure fastener is engaged.

9. The kit of claim 1, wherein said rubbing board further comprises a marker holder for storing the at least one marker when not in use.

10. The kit of claim 9, wherein said marker holder comprises at least one first recess.

11. The kit of claim 10, further comprising means for releasably retaining the at least one marker in the at least one first recess.

12. The kit of claim 11, wherein said means for releasably retaining the at least one marker in the at least one first recess comprises a plurality of projections on an interior wall of said at least one first recess, and a lip on said at least one marker;

wherein said projections engage the lip when said marker is fully inserted into the at least one first recess.

13. The kit of claim 1, wherein said rubbing object holder comprises at least one recess.

14. The kit of claim 13, further comprising a hinge pivotally attaching the cover to the tray, the cover being moveable between raised and lowered positions on the tray, wherein when the cover is in a lowered position, said at least one recess is substantially closed by the cover.

15. The kit of claim 1, wherein said marker comprises a writing element and an element holder.

16. The kit of claim 15, wherein the writing element is a crayon having a free end for rubbing and an attached end secured to the element holder.

17. The kit of claim 15, wherein said element holder comprises a body having a marker handle and a receptacle for receiving the writing element.

18. The kit of claim 17, wherein the receptacle comprises gripping means for securing the writing element within the receptacle.

19. The kit of claim 18, wherein the gripping means comprises at least one tooth extending into an interior of the receptacle and engaging the writing element.

20. A kit for making rubbings comprises:
   a rubbing board;
   at least one marker; and
   at least one rubbing object;
   said rubbing board includes a top portion comprising a tray, a cover and a hinge pivotally adjoining the cover and the tray;
   wherein said cover is pivotal between raised and lowered positions;
   said tray comprises a depression having a sidewall extending around a perimeter of the depression;
   said cover having first and second surfaces, wherein said first surface is a work surface for supporting said at least one rubbing object when making a rubbing and said work surface being positioned substantially within the depression when the cover is in said lowered position; and
   said at least one rubbing object comprises a front surface with a bas relief pattern.

21. A kit for making rubbings by transferring an image from at least one pre-selected rubbing object onto a sheet of paper by a rubbing process, the kit comprises:
   a rubbing board;
   at least one marker;
   at least one rubbing object; and
   at least one sheet of paper;
   said rubbing board includes a top portion comprising a tray and a cover;
   said tray having a rubbing object holder;
   said cover having first and second surfaces, wherein said first surface is a work surface for supporting said at least one rubbing object when making a rubbing; and
   said at least one rubbing object comprises a front surface having a bas relief pattern.

22. The kit of claim 21, wherein said tray comprises a depression having a sidewall extending around a perimeter of the depression, wherein the work surface of the cover is positioned within the depression and the sidewall of the depression extends beyond the work surface; and wherein to make a rubbing the at least one rubbing object is placed on the first surface of the cover and one of said at least one sheets of paper is placed on top of the at least one rubbing object such that the paper is contained within the depression and the sidewall extends around edges of the paper.

23. The kit of claim 21, wherein each of said at least one rubbing object further comprises a back surface which forms a frictional engagement with said first surface of the cover to inhibit sideways movement of the rubbing object on the cover.

24. The kit of claim 21, wherein said rubbing board includes a bottom portion with a paper storage area in which the paper is stored when not in use.

25. The kit of claim 24, wherein said paper storage area comprises a recess disposed on the bottom portion.

26. The kit of claim 25, wherein said top and bottom portions of the rubbing board are pivotally attached by a first hinge, and the rubbing board includes opened and closed configurations; when said rubbing board is in the opened configuration, the top and bottom portions extend angularly away from each other and the recess is exposed, when said rubbing board is in the closed configuration, the top and bottom portions extend adjacently to each other and the recess is covered by the top portion.

27. The kit of claim 26, further comprising a closure fastener to releasably secure said top and bottom portions in the closed configuration.

28. A kit for making rubbings by transferring an image of at least one preselected rubbing object onto a sheet of paper by a rubbing process, the kit comprises:

a rubbing board;

at least one marker; and at least one rubbing object;

said rubbing board includes top and bottom portions pivotally attached by a first hinge to rotate between opened and closed configurations;

said top portion comprises a tray, a cover and a closure fastener for releasably securing the top and bottom portions in the closed configuration;

said tray includes at least one first recess for storing the at least one marker and at least one second recess for storing the at least one rubbing object;

said bottom portion comprises upper and lower surfaces and a third recess for storing paper, said closure fastener comprises a first latching part on one of said top and bottom portions and a second latching part on the other of said top and bottom portions, wherein said first latching part snap fits into said second latching part to engage the closure fastener and releasably secure the top and bottom portions together in the closed configuration;

wherein when said rubbing board is in the closed configuration, the top and bottom portions extend generally adjacent to each other, said top portion substantially covers the third recess in the bottom portion, and said closure fastener is engaged; and when said rubbing board is in the opened configuration, said top and bottom portions extend away from each other, said closure fastener is not engaged and the third recess is exposed;

said depression having a sidewall extending around a perimeter thereof;

said rubbing board further comprises a second hinge pivotally adjoining the cover and the tray;

said cover is a planar member comprising a work surface and a second surface, and is moveable between raised and lowered positions on the tray;

wherein when the cover is in the lowered position the cover is located within the depression and is adjacent to the at least one second recess, the cover closes the at least one second recess and the sidewall of the depression extends around the cover; and when the cover is in the raised position the cover extends angularly outwardly from the tray and the at least one second recess is open;

said top portion further includes at least one protrusion for releasabaly securing the cover in the lower position, wherein said at least one protrusion is disposed on the sidewall of the depression and extends outwardly over an edge of the cover when the cover is in the lowered position;

a handle comprises a top part disposed on said top portion and a bottom part disposed on said bottom portion;

said marker comprises a writing element and an element holder, said element holder including a receptacle for receiving the writing element, a body and a marker handle; said receptacle having at least one tooth for releasably securing the writing element therein;

said writing element comprises a crayon with an attached end and a free end, wherein the attached end is secured within the receptacle of the element holder by means for gripping the writing element;

means for releasably retaining the marker in the first recess comprise at least one resilient projection and a lip, wherein said at least one resilient projection is disposed in the first recess, said lip extends outwardly from the body of said element holder, and said at least one resilient projection engages said lip when the marker is fully inserted into the at least one recess;

said at least one rubbing object comprises front and back surfaces;

said front surface of said at least one rubbing object includes a bas relief pattern;

said back surface of the at least one rubbing object is soft plastic and forms a frictional engagement with the work surface of the cover to inhibit sideways movement of the rubbing object on the cover;

wherein to make a rubbing the at least one rubbing object is arranged on the cover with the back surface frictionally engaging the work surface of the cover and the front surface facing away from the cover; a sheet of paper is placed over the cover with the paper resting on the rubbing object and being contained within the sidewall of the depression; the free end of the crayon is positioned adjacent to the paper, pressing the crayon onto the paper the marker is moved back and forth across the paper with the rubbing object underneath, thereby creating a rubbed image of the bas relief pattern on the paper.

* * * * *